United States Patent
Yoshimura

(10) Patent No.: US 7,587,716 B2
(45) Date of Patent: Sep. 8, 2009

(54) ASYMMETRICAL MULTIPROCESSOR SYSTEM, IMAGE PROCESSING APPARATUS AND IMAGE FORMING APPARATUS USING SAME, AND UNIT JOB PROCESSING METHOD USING ASYMMETRICAL MULTIPROCESSOR

(75) Inventor: Hideyoshi Yoshimura, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 1316 days.

(21) Appl. No.: 10/783,347

(22) Filed: Feb. 20, 2004

(65) Prior Publication Data
US 2004/0187126 A1    Sep. 23, 2004

(30) Foreign Application Priority Data
Feb. 21, 2003 (JP) .............................. 2003-045042

(51) Int. Cl.
G06F 9/46    (2006.01)
G06F 1/00    (2006.01)
G06F 1/26    (2006.01)

(52) U.S. Cl. ........................ 718/100; 718/103; 718/104; 718/105; 713/300; 713/320

(58) Field of Classification Search ................ 718/100, 718/103, 104, 105; 713/300, 320
See application file for complete search history.

(56) References Cited

U.S. PATENT DOCUMENTS

| | | | |
|---|---|---|---|
| 5,301,324 A | | 4/1994 | Dewey et al. |
| 5,303,369 A | | 4/1994 | Borcherding et al. |
| 5,568,646 A | * | 10/1996 | Jaggar ........................ 712/209 |
| 6,112,023 A | * | 8/2000 | Dave et al. ..................... 703/27 |
| 6,298,370 B1 | * | 10/2001 | Tang et al. ................... 718/102 |
| 7,197,627 B1 | * | 3/2007 | Naylor ......................... 712/34 |
| 2002/0010848 A1 | * | 1/2002 | Kamano et al. ............... 712/34 |
| 2004/0003309 A1 | * | 1/2004 | Cai et al. ..................... 713/320 |

FOREIGN PATENT DOCUMENTS

| | | |
|---|---|---|
| JP | 04-153764 | 5/1992 |
| JP | 04-348483 | 12/1992 |
| JP | 06-274608 | 9/1994 |
| JP | 08-044678 | 2/1996 |
| JP | 11-202988 | 7/1999 |
| JP | 2002-099433 | 4/2002 |

* cited by examiner

*Primary Examiner*—Van H Nguyen
*Assistant Examiner*—Kenneth Tang
(74) *Attorney, Agent, or Firm*—Steven M. Jensen; David G. Conlin; Edwards Angell Palmer & Dodge LLP

(57) ABSTRACT

An asymmetrical multiprocessor system includes a plurality of processors. At least the first processor and the second processor are asymmetrical to each other. The plurality of processors execute a plurality of unit jobs, workloads for which are foreseeable, the unit jobs being allocated job by job to the plurality of processors. For this purpose, a unit job list, which is used as reference information when the unit jobs are allocated to the plurality of processors, are prepared. Based on the unit job list, unit job scheduling is performed, so as to determine in what order the unit jobs are to be executed, and to which processor the unit jobs are to be allocated. With this arrangement, it is possible to attain a high capability with less hardware resources.

15 Claims, 14 Drawing Sheets

FIG. 5 (a)

| UNIT JOB NAME | TIME UNIT/LINE | | EXECUTABLE FOR DSP CORE B 21? | PROCESS THAT SHOULD BE EXECUTED NEXT |
| --- | --- | --- | --- | --- |
| | MINIMUM EXECUTION TIME | MAXIMUM EXECUTION TIME | | |
| SHADING CORRECTION PROCESS | 5 | 15 | YES | INPUT GAMMA CORRECTION PROCESS |
| INPUT GAMMA CORRECTION PROCESS | 20 | 35 | YES | REGION SEPARATING PROCESS |
| REGION SEPARATING PROCESS | 130 | 320 | YES | FILTERING PROCESS |
| FILTERING PROCESS | 60 | 160 | NO | VARIABLE MAGNIFICATION PROCESS |
| VARIABLE MAGNIFICATION PROCESS | 35 | 45 | YES | COLOR CORRECTION PROCESS |
| COLOR CORRECTION PROCESS | 120 | 140 | NO | MULTIVALUED DITHERING PROCESS |
| MULTIVALUED DITHERING PROCESS | 60 | 80 | YES | NONE |

FIG. 5 (b)

| | TIME UNIT/LINE |
| --- | --- |
| INTERVAL OF RECEIVING MAIN SCANNING LINE DATA | 350 |

FIG. 9 (a)

| UNIT JOB NAME | DSP CORE A | | | DSP CORE B | | | PROCESS THAT SHOULD BE EXECUTED NEXT |
|---|---|---|---|---|---|---|---|
| | MINIMUM EXECUTION TIME | AVERAGE EXECUTION TIME | MAXIMUM EXECUTION TIME | MINIMUM EXECUTION TIME | AVERAGE EXECUTION TIME | MAXIMUM EXECUTION TIME | |
| SHADING CORRECTION PROCESS | 45 | 50 | 55 | 45 | 50 | 55 | INPUT GAMMA CORRECTION PROCESS |
| INPUT GAMMA CORRECTION PROCESS | 60 | 70 | 75 | 60 | 70 | 75 | REGION SEPARATING PROCESS |
| REGION SEPARATING PROCESS | 130 | 200 | 320 | 130 | 200 | 320 | FILTERING PROCESS |
| FILTERING PROCESS (FILTERING PROCESS CODE A) | 60 | 120 | 160 | – | – | – | VARIABLE MAGNIFICATION PROCESS |
| FILTERING PROCESS (FILTERING PROCESS CODE B) | – | – | – | 100 | 200 | 300 | VARIABLE MAGNIFICATION PROCESS |
| VARIABLE MAGNIFICATION PROCESS | 65 | 70 | 75 | 65 | 70 | 75 | COLOR CORRECTION PROCESS |
| COLOR CORRECTION PROCESS | 180 | 190 | 200 | – | – | – | MULTIVALUED DITHERING PROCESS |
| MULTIVALUED DITHERING PROCESS | 120 | 140 | 160 | 120 | 140 | 160 | NONE |

TIME UNIT/LINE

FIG. 9 (b)

| INTERVAL OF RECEIVING MAIN SCANNING LINE DATA | TIME UNIT/LINE |
|---|---|
| | 500 |

FIG. 11

| | | DSP CORE A | DSP CORE B |
|---|---|---|---|
| JOB CURRENTLY ALLOCATED FOR EXECUTION | NAME | COLOR CORRECTION PROCESS | REGION SEPARATING PROCESS |
| | TARGET MAIN SCANNING LINE NUMBER | 99 | 100 |
| | ESTIMATED COMPLETION TIME | 50220(MIN), 50230(TYP), 50240(MAX) | 50180(MIN), 50250(TYP), 50370(MAX) |
| JOB TO BE ALLOCATED NEXT FOR EXECUTION | NAME | MULTIVALUED DITHERING PROCESS | UNOCCUPIED |
| | TARGET MAIN SCANNING LINE NUMBER | 99 | |
| | EXECUTION STARTABLE TIME | 50220(MIN), 50230(TYP), 50240(MAX) | |
| | ESTIMATED COMPLETION TIME | 50340(MIN), 50370(TYP), 50400(MAX) | |

| | | |
|---|---|---|
| LIST OF EXECUTABLE UNIT JOBS | NAME | FILTERING PROCESS |
| | TARGET MAIN SCANNING LINE NUMBER | 100 |
| | EXECUTION STARTABLE TIME | 50180(MIN), 50250(TYP), 50370(MAX) |
| LIST OF SCHEDULED UNIT JOBS | NAME | SHADING CORRECTION PROCESS |
| | TARGET MAIN SCANNING LINE NUMBER | 101 |
| | EXECUTION STARTABLE TIME | 50500 (UNIT JOB ALLOCATED PERIODICALLY) |

FIG. 12 (a)

| UNIT JOB NAME | DSP CORE A | | | | DSP CORE B | | | | PROCESS THAT SHOULD BE EXECUTED NEXT |
|---|---|---|---|---|---|---|---|---|---|
| | MINIMUM EXECUTION TIME | AVERAGE EXECUTION TIME | MAXIMUM EXECUTION TIME | AVERAGE POWER CONSUMPTION INDEX | MINIMUM EXECUTION TIME | AVERAGE EXECUTION TIME | MAXIMUM EXECUTION TIME | AVERAGE POWER CONSUMPTION INDEX | |
| SHADING CORRECTION PROCESS | 45 | 50 | 55 | 60 | 45 | 50 | 55 | 40 | INPUT GAMMA CORRECTION PROCESS |
| INPUT GAMMA CORRECTION PROCESS | 60 | 70 | 75 | 80 | 60 | 70 | 75 | 50 | REGION SEPARATING PROCESS |
| REGION SEPARATING PROCESS | 130 | 200 | 320 | 270 | 130 | 200 | 320 | 180 | FILTERING PROCESS |
| FILTERING PROCESS (FILTERING PROCESS CODE A) | 60 | 120 | 160 | 140 | – | – | – | – | VARIABLE MAGNIFICATION PROCESS |
| FILTERING PROCESS (FILTERING PROCESS CODE B) | – | – | – | – | 100 | 200 | 300 | 160 | VARIABLE MAGNIFICATION PROCESS |
| VARIABLE MAGNIFICATION PROCESS | 65 | 70 | 75 | 80 | 65 | 70 | 75 | 60 | COLOR CORRECTION PROCESS |
| COLOR CORRECTION PROCESS | 180 | 190 | 200 | 220 | – | – | – | – | MULTIVALUED DITHERING PROCESS |
| MULTIVALUED DITHERING PROCESS | 120 | 140 | 160 | 170 | 120 | 140 | 160 | 110 | NONE |

TIME UNIT/LINE

FIG. 12 (b)

| | TIME UNIT/LINE |
|---|---|
| INTERVAL OF RECEIVING MAIN SCANNING LINE DATA | 500 |

ASYMMETRICAL MULTIPROCESSOR SYSTEM, IMAGE PROCESSING APPARATUS AND IMAGE FORMING APPARATUS USING SAME, AND UNIT JOB PROCESSING METHOD USING ASYMMETRICAL MULTIPROCESSOR

This Nonprovisional application claims priority under 35 U.S.C. § 119(a) on Patent Application No. 2003/045042 filed in Japan on Feb. 21, 2003, the entire contents of which are hereby incorporated by reference.

FIELD OF THE INVENTION

The present invention relates to (i) an asymmetrical multiprocessor system for executing a plurality of unit jobs by using an asymmetrical multiprocessor, (ii) an image processing apparatus and an image forming apparatus using the asymmetrical multiprocessor system, and (iii) a unit job processing method using an asymmetrical multiprocessor.

BACKGROUND OF THE INVENTION

In printing operation of a digital image forming apparatus such as a full-color copying apparatus, data inputted from an image input apparatus such as a scanner is outputted to an image output apparatus such as an electrophotographic output engine or an inkjet output engine. In the printing operation, it is necessary that the digital image forming apparatus carry out image processing operation, so as to convert RGB data, which is supplied from the image input apparatus, into CMYK data or the like data compatible with the image output apparatus.

In the image processing operation, a huge amount of data is processed. Moreover, a high-speed real-time output is required, so as to catch up with operation of the image output apparatus. Therefore, in most cases, hard-wired ASICs (Application Specific Integrated Circuits) have been used in conventional hardware that performs the image processing operation.

However, thanks to recently improved capabilities of general-purpose processors and DSPs (Digital Signal Processors), it is now possible to perform the image processing operation by using software. Even under such a circumstance, problems will arise if a processor having only one processing section for executing instructions is used for carrying out the image processing operation for a digital image forming apparatus such as a full-color copying apparatus. This is because a capability of such a processor is insufficient. In many cases, therefore, the image processing operation is performed by using (i) an MIMD (Multiple Instruction, Multiple Data) type processor typified by an SIMD (Single Instruction, Multiple Data) type processor and a VLIW (Very Long Instruction Word) type processor, the MIMD type processor being such that a plurality of processing sections are mounted in a single processor element, (ii) a processor in which both the SIMD and the VLIW are used, or (iii) a multiprocessor system using a plurality of (i)/or (ii).

Incidentally, in case the image processing operation is performed as described above by using a processor having a plurality of processing sections or by using multiprocessors, there is a problem of division of the operation, i.e. a problem of determining which part of the operation is allocated to which computing unit.

In order to divide the operation, if the image processing operation is performed by using an SIMD type processor, it is necessary to divide data. This is because an SIMD type processor processes many sets of data in accordance with a single instruction.

Meanwhile, with the arrangements of an MIMD type processor and a multiprocessor, the image processing can be divided with respect to instructions or instruction groups. For example, Japanese Publication for Unexamined Patent Application, Tokukaihei 8-44678 (publication date: Feb. 16, 1996) (hereinafter "the first related art") discloses a method in which data is processed after the data is divided in accordance with a load of each CPU.

The recently improved capabilities of general-purpose processors and DSPs are realized principally by increased scale of circuits that can be integrated, and by improvement of an operating speed. Meanwhile, the improved processing capabilities lead to a problem of increased power consumption. In response to this problem, for example, Japanese Publication for Unexamined Patent Application, Tokukai 2002-99433 (publication date: Apr. 5, 2002) (hereinafter "the second related art") discloses a system that reduces power consumption by adjusting an operating frequency and a line voltage of each processor, so as to meet, at each moment during operation, requirements on each periodic real-time task under operation.

Moreover, Japanese Publication for Unexamined Patent Application, Tokukaihei 6-214961 (publication date: Aug. 5, 1994) (corresponding to U.S. Pat. No. 5,301,324, hereinafter "the third related art") discloses an apparatus that performs reallocation dynamically by task-redirecting operation for an asymmetrical processor.

How to arrange a plurality of processing sections of a processor is an important factor. In the image processing operation, some processes (e.g. a table referring process) require a lot of memory, and some processes (e.g. an FIR (Finite Impulse Response) filtering process) are mostly about calculation. Moreover, in some processes in which one process is repeated (e.g. an FFT (Fast Fourier Transform) process), performance is drastically improved by using an exclusive instruction.

In light of the above, in an MIMD type processor arrangement or a multiprocessor arrangement, with which the image processing operation can be divided with respect to instructions or instruction groups, an asymmetrical processor arrangement is more advantageous than a symmetrical processor arrangement. This is because the asymmetrical processor arrangement, in which processing sections are arranged asymmetrically, require less hardware resources (e.g. memory, circuit size, and the like) for processors than the symmetrical processor arrangement does, in which each processing section or each processor equally has hardware resources (e.g. memory, instructions, and the like) that are necessary only for some processes.

In the asymmetrical multiprocessor arrangement, one processor is different from another processor in terms of hardware conditions, and the image processing operation as a whole is not carried out by using all the processors. Therefore, the method described in the first related art, that is, a method in which image data is divided and allocated to processing sections, cannot be employed.

Moreover, in many cases, the processors (image processing processors) for use in the image processing operation have a special arrangement for the image processing, so as to perform high-speed processing. In such cases, it is more efficient to use a general-purpose processor so as to perform sequence control and the like, such as a dispatch process for allocating jobs. However, in a multiprocessor arrangement in which a plurality of image processing processors are provided, if unit jobs to be allocated are determined in accordance with loads, as described in the third related art, the image processing processors do not operate while the dispatch is performed. As a result, a processing speed of the system as a whole is decreased.

Moreover, in the first related art, the process is divided only in light of processing capability, without considering power-consumption saving. On the other hand, in the second related art, processing capability necessary for each processor at each moment during operation is calculated, and power consumption is controlled in accordance with results of the calculations. However, because the calculations are performed with respect to each processor element, it is not considered in the power-consumption control that power consumption is different from one processor element to another. As a result, with this arrangement, power consumption of the asymmetrical multiprocessor cannot be saved sufficiently.

SUMMARY OF THE INVENTION

The present invention was made to solve the problems above. An object of the present invention is to provide an asymmetrical multiprocessor system that realizes a high processing capability with less hardware resources, and that efficiently reduces power consumption.

To solve the problems above, an asymmetrical multiprocessor system of the present invention is an asymmetrical multiprocessor system including a plurality of processors for executing a plurality of unit jobs, workloads for which are foreseeable, the unit jobs being allocated job by job to the plurality of processors, at least a first processor and a second processor being asymmetrical to each other, the asymmetrical multiprocessor system including: a unit job processing information generating section for generating unit job processing information, which is used as reference information when the unit jobs are allocated to the plurality of processors; and a unit job scheduling section for determining, in accordance with the unit job processing information, in what order the unit jobs are to be executed, and to which processor the unit jobs are to be allocated.

According to this arrangement, when the plurality of jobs, the workloads for which are foreseeable, are executed in the plurality of asymmetrical processors, the unit job scheduling section determines, in accordance with the unit job processing information generated in the unit job processing information generating section, in what order the unit jobs are to be executed, and to which processor the unit jobs are to be allocated.

This arrangement makes it possible to make use of capability of each processor appropriately, thereby attaining a high processing capability with less hardware resources.

The asymmetrical multiprocessor system may be arranged so that at least one of the unit job is executable for the first processor and the second processor in accordance with programs that are different from each other.

With this arrangement, the same unit job is executable for the plurality of processors that are asymmetrical. This increases a degree of freedom in performing unit job scheduling. Therefore, it is easy to perform such job scheduling with which execution time for the unit jobs is shorter than that of a case in which a unit job is executable only for a particular processor. As a result, it is easily to effectively use the capabilities of the asymmetrical processors.

The asymmetrical multiprocessor system may be arranged so that the unit job processing information includes information about power consumption of each of the processors; and in accordance with the information about power consumption, the unit job scheduling section determines to which processor the unit jobs are to be allocated, determination being done in such a manner that the power consumption is reduced.

With this arrangement, the information about power consumption is reflected in the scheduling for the unit jobs to be executed in the processors. As a result, it is possible to reduce the power consumption efficiently.

For a fuller understanding of the nature and advantages of the invention, reference should be made to the ensuing detailed description taken in conjunction with the accompanying drawings.

BRIEF DESCRIPTION OF THE DRAWINGS

FIG. 5(a) is an explanatory diagram illustrating information about the unit jobs, the information being used when the unit job scheduling is performed by a general-purpose CPU shown in FIG. 3. FIG. 5(b) is an explanatory diagram illustrating information about an interval of receiving main-scanning line data when the unit jobs are executed.

FIG. 9(a) is an explanatory diagram illustrating information about the unit jobs, the information being used when unit job scheduling is performed by the general-purpose CPU shown in FIG. 8. FIG. 9(b) is an explanatory diagram illustrating information about an interval of receiving main-scanning line data when the unit jobs are executed.

FIG. 11 is an explanatory diagram illustrating one example of the unit job scheduling operation performed by the general-purpose CPU shown in FIG. 8.

FIG. 12(a) is an explanatory diagram illustrating information about unit jobs, the information being used when unit job scheduling is performed by a general-purpose CPU of an image processing section using an asymmetric multiprocessor system of yet another embodiment of the present invention. FIG. 12(b) is an explanatory diagram illustrating information about an interval of receiving main-scanning line data when the unit jobs are executed.

DESCRIPTION OF THE EMBODIMENTS

First Embodiment

With reference to the drawings, one embodiment of the present invention is described below. In the present embodiment, described is a case in which an asymmetrical multiprocessor system is used in an image processing apparatus of an image forming apparatus.

Figure 2:
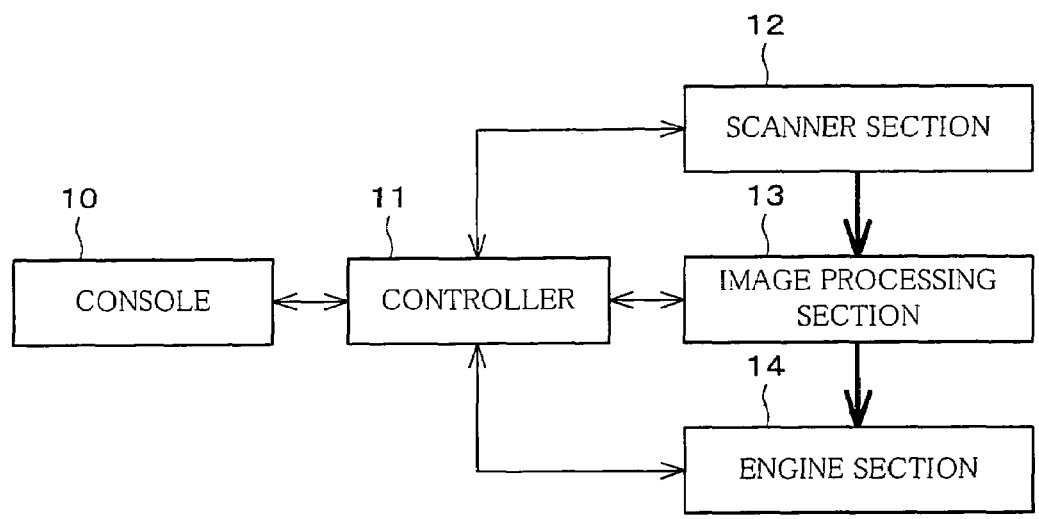
FIG. 2 is a block diagram illustrating an arrangement of the digital copying apparatus using the asymmetrical multiprocessor system of one embodiment of the present invention.

As shown in FIG. 2, the image forming apparatus which is for example a digital copying apparatus includes a console 10, a controller 11, a scanner section (image input apparatus) 12, an image processing section (image processing apparatus) 13, and an engine section (image output apparatus) 14.

The console 10 includes (i) a liquid crystal display device for interfacing with a user, and (ii) buttons and the like for use in making instructions for operation.

The controller 11 includes a general-purpose CPU (Central Processing Unit). The controller 11 controls a series of copying operation by controlling the scanner section 12, the image processing section (image processing apparatus) 13, and the engine section 14.

The scanner section 12 includes a CCD (Charge Coupled Device) line image sensor unit, and a sub-scanning direction driving system. The scanner section 12 scans a document, and generates an RGB (R: red, G: green, B: blue) color signal with respect to each main scanning line. Then, the scanner section 12 converts only an effective range of the RGB color signal into digital data by A/D conversion. Finally, the scanner section 12 outputs the digital data to the image processing section 13. Here, the scanner section 12 outputs, to the image processing section 13, main scanning line data, which is to be processed at a certain interval in accordance with a scanning speed.

The image processing section 13 receives the RBG image data from the scanner section 12, and generates CMYK image data. Then, the image processing section 13 outputs the CMYK image data to the engine section 14.

The engine section 14 uses, as an output device, a tandem-type electrophotographic color output engine using toner of four colors CMYK, for example. The engine section 14 receives, from the image processing section 13, a CMYK data value of one page. Then, in accordance with the CMYK data value, the engine section 14 outputs an image to an output sheet. Note that the engine section 14 may use, as an output device, an inkjet output engine using ink of four colors CMYK.

Figure 3:
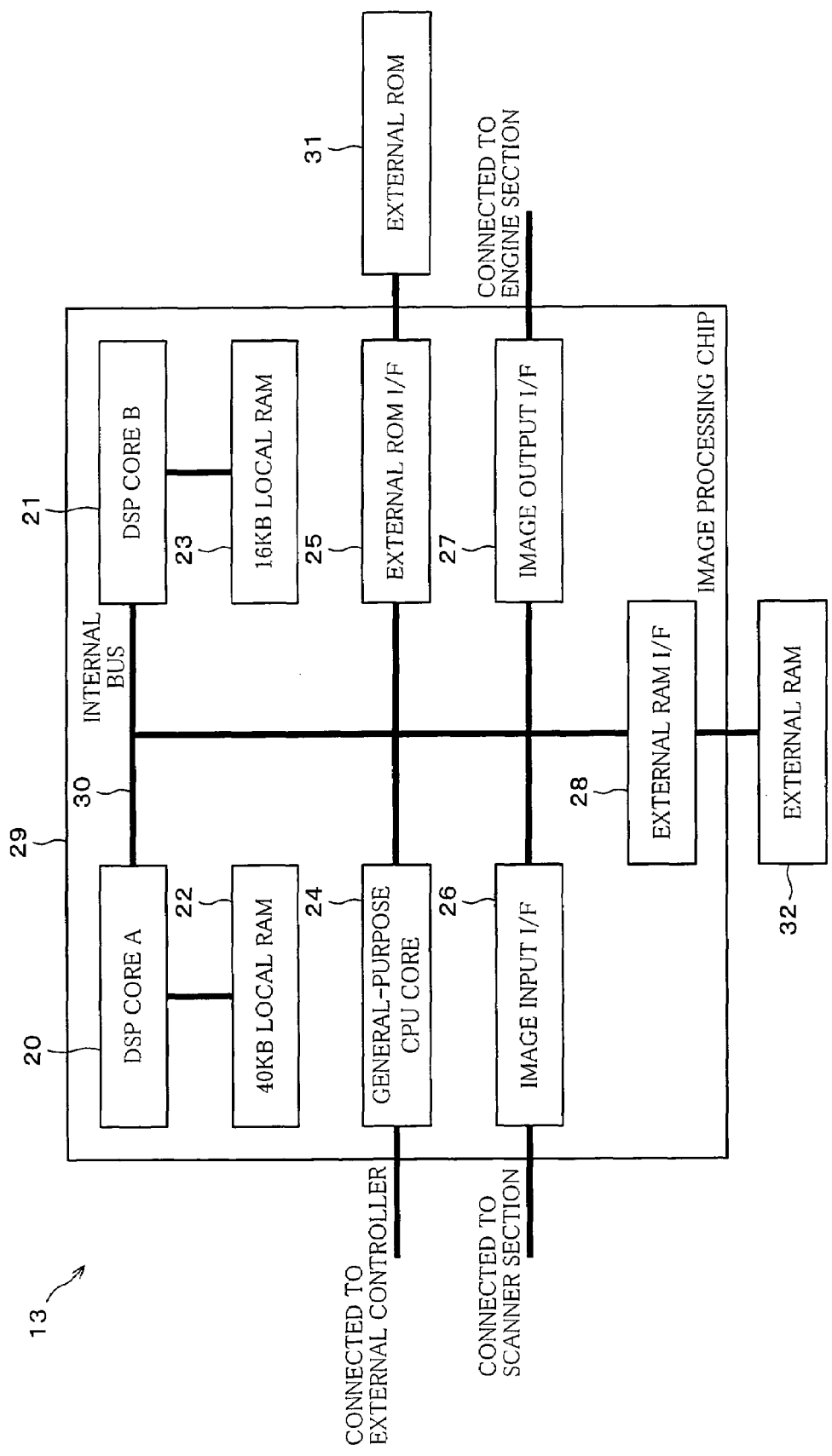
FIG. 3 is a block diagram illustrating an arrangement of the image processing section shown in FIG. 2.

Next, an arrangement and a function of the image processing section 13 are described. As shown in FIG. 3, the image processing section 13 includes an image processing chip 29, an external ROM 31, and an external RAM 32. The image processing chip 29 includes a DSP (Digital Signal Processor) core A (first processor) 20, a DSP core B (second processor) 21, a 40 KB local RAM (local memory) 22, a 16 KB local RAM (local memory) 23, a general-purpose CPU 24, an external ROM I/F 25, an image input I/F 26, an image output I/F 27, and an external RAM I/F 28.

The general-purpose CPU 24 receives an instruction from the controller 11, and controls operation of the image processing section 13 as a whole, the operation being operation necessary to execute the copying operation.

The DSP core A 20 is a main DSP, and the DSP core B 21 is a sub DSP. An instruction executable for the DSP core A 20 is a superset in which an SIMD processing instruction is added to an instruction executable for the DSP core B 21. This is aimed at improving an execution speed of a filtering process, which is described later.

To the DSP core A 20, the 40 KB local RAM 22 is connected as a local memory thereof. To the DSP core B 21, the 16 KB local RAM 23 is connected as a local memory thereof. The 40 KB local RAM 22 is used as a work memory when a unit job is executed by the DSP core A 20. The 16 KB local RAM 23 is used as a work memory when a unit job is executed by the DSP core B 21.

With the arrangement above, the DSP core A 20 can execute all kinds of unit-job-execution programs for executing unit jobs that constitute the image processing operation performed by the image processing section. On the other hand, the DSP core B 21 can execute only some kinds of the unit-job-execution programs, e.g. those unit jobs other than the filtering process and a color correction process.

The external ROM I/F 25 converts a signal supplied via an internal bus 30, so that the signal can be inputted to the external ROM 31. Here, processing blocks provided inside the image processing chip 29 are connected with each other by the internal bus 30.

The external RAM I/F 28 converts a signal supplied via the internal bus 30, so that the signal can be inputted to the external RAM 32. In accordance with a directive from the general-purpose CPU 24, the image input I/F 26 stores, in the external RAM 32 via the external RAM I/F 28, the RGB image data supplied from the scanner section 12. In accordance with a directive from the general-purpose CPU 24, the image output I/F 27 reads out, via the external RAM I/F 28, the CMYK image data stored in the external RAM 32.

In accordance with a directive from the controller 11, the image processing section 13 performs a series of image processing operation shown in the flowcharts of FIGS. 4(a) and 4(b). The image processing operation include the following unit jobs: a shading correction process, an input gamma correction process, a region separating process, a filtering process, a variable magnification process, a color correction process, and a multivalued dithering process. Each of these jobs is allocated to the DSP core A 20 or the DSP core B 21 after scheduling is performed. In the scheduling, the general-purpose computer 24 determines which of the DSP core A 20 and the DSP core B 21 executes the job.

In each unit job, data to be processed, which is specified by the general-purpose CPU 24, is fetched from the external RAM 32. Then, processing result data is stored in a processing result storing region, which is also specified by the general-purpose CPU 24. The processing result storing region is in the external RAM 32. Thus, between the unit jobs, data is fetched and stored via the external RAM 32. This is also true with data inputted from the scanner section 12 and data outputted to the engine section 14. Until the process is terminated, the data is retained in the external RAM 32. Therefore, the external RAM 32 is designed so that its memory capacity is large enough to retain in the memory, even under a worst condition, the data that is fetched and stored.

Note that the worst condition is a condition under which every unit job requires, in order to complete the process thereof, time indicated by a maximum value. However, due to dependency relations between the unit jobs, there are cases in which, if a unit job (e.g. the region separating process) requires time indicated by a maximum value, another unit job (e.g. the filtering process) is completed always within time indicated by a value lower than a maximum value. Taking such cases into consideration, the worst condition is a condition that requires longest execution time in the system, among all conditions for combinations of the dependency.

Next, the image processing operation performed by the image processing section 13 is described, with reference to the flowcharts of FIGS. 4(a) and 4(b).

First, as shown in FIG. 4(a), the image processing section 13 judges whether or not main scanning line data has been received from the scanner section 12, and if main scanning line data has not been received, the image processing section 13 waits until main scanning line data is received (S11). If main scanning line data has been received, one-line processing operation for that line is started (S12). When processing is completed with respect to all lines (S13), the image processing operation is terminated.

In the one-line processing operation, the image processing section 13 sequentially executes the unit jobs shown in FIG. 4(b). The unit jobs are stored in the external ROM 31, as program codes that operate in the DSP core A 20 and the DSP core B 21. Each unit job is executed by being read out by the DSP core A 20 or the DSP core B 21.

In the one-line processing operation, as shown in FIG. 4(b), the following unit jobs are sequentially performed: a shading correction process (S22), an input gamma correction process (S24), a region separating process (S26), a filtering process (S28), a variable magnification process (S30), a color correction process (S32), and a multivalued dithering process (S34). Moreover, at a timing before a beginning of each unit job and at a timing at an end of each unit job, a scheduling process for the unit job is performed (S21, S23, S25, S27, S29, S31, S33, and S35).

In the shading correction process (S22), input data whose light amount is distributed in a main scanning direction is corrected, so as to convert the data into data whose light amount is not distributed. Specifically, the digital RGB signal transmitted from the scanner section 12 is processed, so as to remove various distortions that have occurred in an illumination system, an imaging system, and an image pickup system of the color image input apparatus.

In the input gamma correction process (S24), input characteristics of the image input apparatus is corrected so that the image data becomes linear with respect to a sensitivity of the CCD. By doing so, the input characteristics of the image input apparatus are handled easily in subsequent image processing.

In the region separating process (S26), one bit of a property value representative of a character pixel or a non-character pixel is added to each pixel of the image inputted.

In the filtering process (S28), each pixel is filtered by a two-dimensional FIR (Finite Impulse Response), so as to judge, by using property information of the pixel, whether or not the pixel belongs to a character region. If the pixel belongs to a character region, an emphatic filtering process is performed so as to emphasize character edges, by using pixel data of 25 pixels, i.e. five pixels in the main scanning direction and five pixels in the sub-scanning direction, centering on the pixel in question. If the pixel belongs to a non-character region, a smoothing filtering process is performed so as to remove noises, by using pixel data of 49 pixels, i.e. seven pixels in the main scanning direction and seven pixels in the sub-scanning direction, centering on the pixel in question. In order to perform high-speed processing, the filtering process is written in a program code that uses SIMD (Single Instruction, Multiple Data) instructions. Therefore, only the DSP core A 20 can execute the filtering process.

In the variable magnification process (S30), the image data inputted is processed by variable magnification in the main scanning direction, so that the image is scaled up or scaled down in the main scanning direction.

In the color correction process (S32), RGB multivalued data is converted into CMYK multivalued data. Specifically, in order to attain high-fidelity color reproduction, RGB values are converted, by calculation, into CMYK values by using table reference values that are in accordance with spectral characteristics of a CMYK color material including an unnecessary absorption component. A memory capacity required for storing the table reference values is approximately 35.1 Kbytes. Therefore, only the DSP core A 20 can execute the color correction process.

In the multivalued dithering process (S34), a dithering process is performed so that CMYK data having 256 gradations with respect to each color is expressed by using 16 gradations with respect to each color, in conformity with a capability of the engine section 14.

As described above, after the foregoing unit jobs are executed, it is judged whether or not processing for all the main scanning lines are completed (S13). If the processing for all the main scanning lines is not completed, the processes of S11 to S13, including the processes of S21 to S35, are continued, until the processing for all the main scanning lines is completed.

Next, the unit job scheduling is described. In the image processing operation, the general-purpose CPU 24 performs the sequential control. At this time, the unit job scheduling is performed, i.e. orders of execution of the unit jobs are determined, and the unit jobs are allocated to the DSP core A 20 and the DSP core B 21.

The unit job scheduling is executed by the general-purpose CPU 24 at the beginning of the image processing operation, and upon each unit job completion notification from the DSP cores. Because the unit job scheduling itself requires time, the general-purpose CPU 24 determines, every time execution of a unit job is completed by the DSP cores, which unit job should be executed next. In this way, the DSP cores can operate effectively. Therefore, in the present embodiment, the DSP cores are treated and scheduled as job slots for two kinds of jobs, i.e. the jobs to be executed now and the jobs to be executed next.

Figure 1:
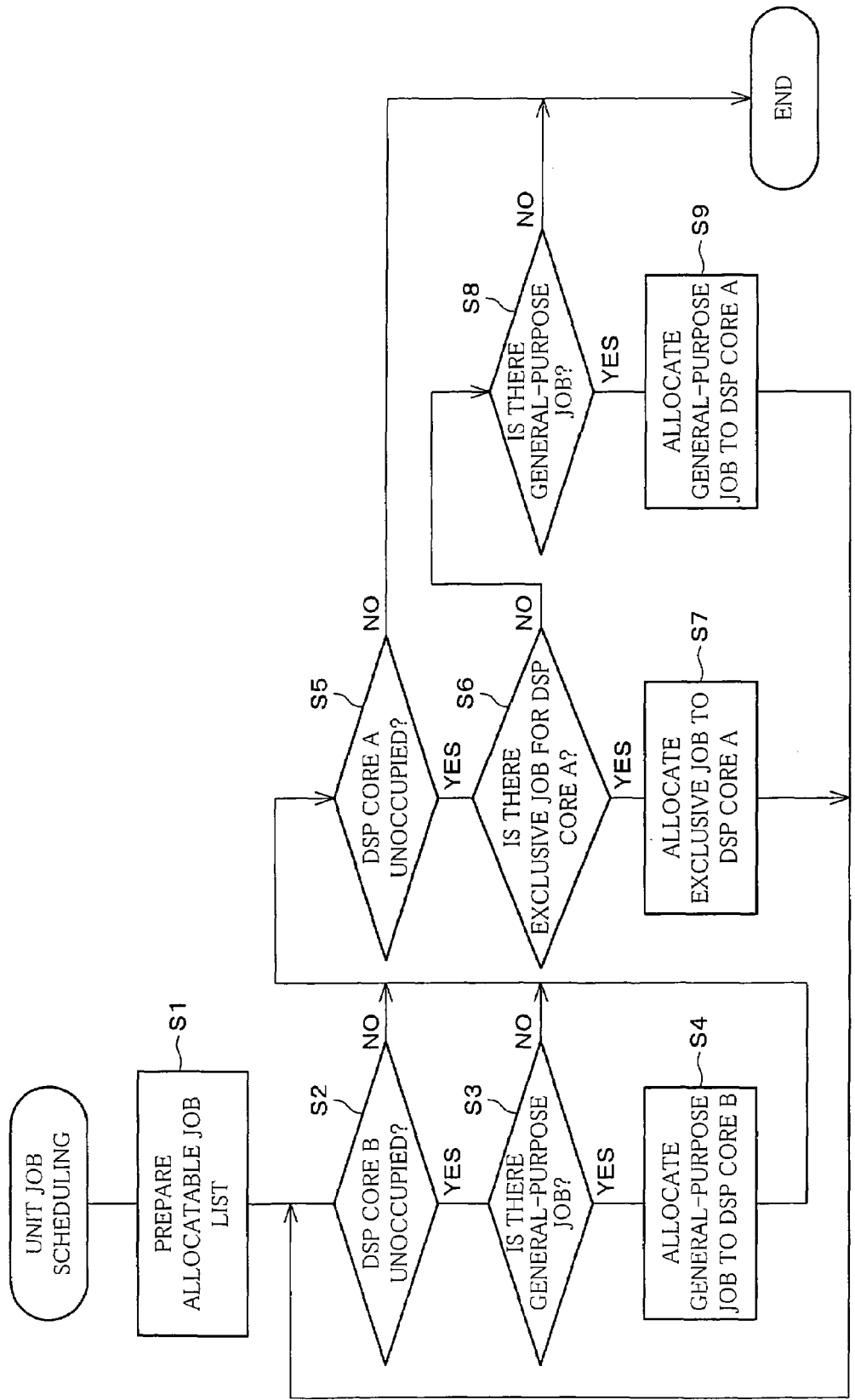
FIG. 1 is a flowchart illustrating unit job scheduling operation of an image processing section of a digital copying apparatus using an asymmetrical multiprocessor system of one embodiment of the present invention.

Next, an example of scheduling operation of the general-purpose CPU (unit job processing information generating means, unit job scheduling means) 24 is described, with reference to the flowchart of FIG. 1.

The general-purpose CPU 24 has unit job information (unit job processing information) shown in FIGS. 5(a) and 5(b). The unit job information is necessary in performing the scheduling. The unit job information includes (i) minimum and maximum execution time for the unit job, (ii) information about whether or not the unit job is executable for the DSP core B 21, (iii) the dependency relations between the unit jobs, i.e. information about which unit job (image processing) should be executed next to the unit job, (iv) information about an interval of receiving main scanning line data, and (v) the like information.

In performing the scheduling, the general-purpose CPU 24 prepares, with respect to each DSP core, a list of unit jobs executable for the DSP core (target DSP core) (S1). In the list, the unit jobs certainly executable for the target DSP core in an implementation phase are listed up. The unit jobs listed up for this purpose include:

(1) The unit job that is waiting for execution (i.e. that is active) in a scheduling phase;
(2) The unit job to be executed next to the unit job that is being executed by the target DSP core;

(3) The unit job to be executed next to the unit job (unit job A) that is being executed by the other DSP core, if the unit job A will be completed before the unit job (unit job B) that is being executed by the target DSP core is completed (here, it is estimated that the unit job A will be completed in maximum execution time, and the unit job B will be completed in minimum execution time); and (4) The unit job allocated periodically.

Therefore, the list is about these unit jobs.

Note that the unit job of (3) may be the following unit job, considering the scheduling time necessary for the general-purpose CPU 24. Specifically, the unit job of (3) may be the unit job to be executed next to the unit job (unit job A) that is being executed by the other DSP core, if time required for completion of the unit job A (here, it is estimated that the unit job A will be completed in a maximum execution time) is shorter than a sum of (i) minimum execution time for the unit job (unit job B) that is being executed by the target DSP core and (ii) the scheduling time required for the general-purpose CPU 24. In this case, the target DSP core has a function of starting, upon a processing completion notification from the other DSP core, a unit job allocated to the target DSP core.

After the unit job list has been prepared in S1, the general-purpose CPU 24 judges whether or not, in the DSP core B 21, there is any job slot (unoccupied job slot) to which no job is allocated (S2).

Then, if there is any unoccupied job slot, the general-purpose CPU 24 judges whether or not the list of executable unit jobs includes any unit job that is executable in the same processing time by the DSP core A 20 and by the DSP core B 21, i.e. if there is any general-purpose job (S3). If there is any general-purpose job, the general-purpose job is allocated to the DSP core B 21 (S4).

If it is judged in S2 that there is no unoccupied job slot, if it is judged in S3 that there is no general-purpose job, or if the process of S4 is completed, it is judged whether or not the DSP core A 20 has any job slot to which no job is allocated (S5).

If it is judged in S5 that the DSP core A 20 has any job slot to which no job is allocated, it is judged whether or not the list of executable unit jobs includes any unit job that is executable only for the DSP core A 20, i.e. if there is any exclusive job (S6). If there is any exclusive job, the exclusive job is allocated to the DSP core A 20 (S7). Then, the scheduling process turns back to S2. If it is judged in S5 that the DSP core A 20 has no unoccupied job slot, the scheduling process is terminated.

On the other hand, if it is judged in S6 that there is no exclusive job, it is judged whether or not there is any general-purpose job on the list of executable jobs (S8). If there is any general-purpose job, the general-purpose job is allocated to the DSP core A 20 (S9). Then, the scheduling process turns back to S2. If it is judged in S8 that there is no executable general-purpose job, the scheduling process is terminated.

Figure 6:
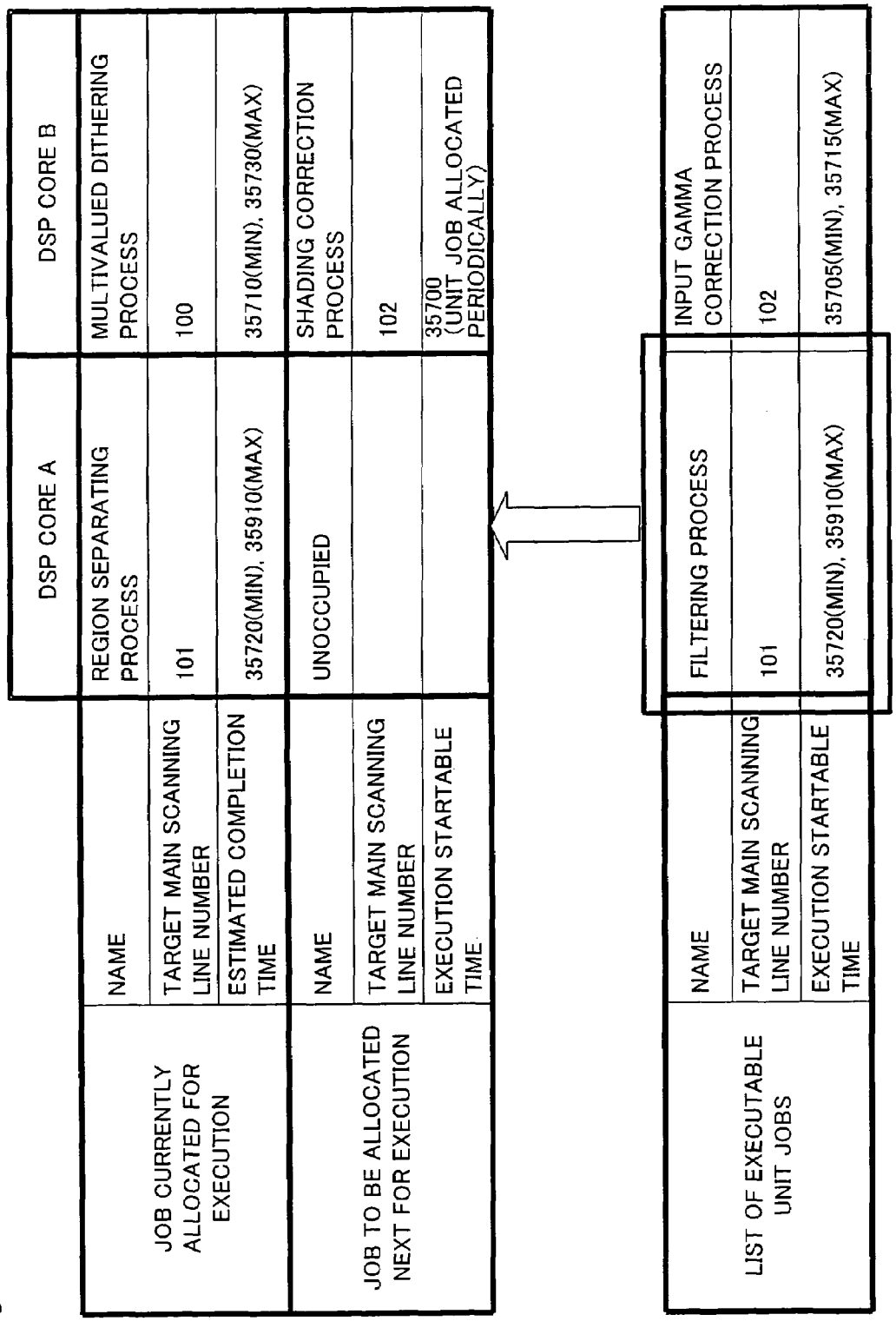
FIG. 6 is an explanatory diagram illustrating one example of the unit job scheduling operation performed by the general-purpose CPU shown in FIG. 3.
Figure 7:
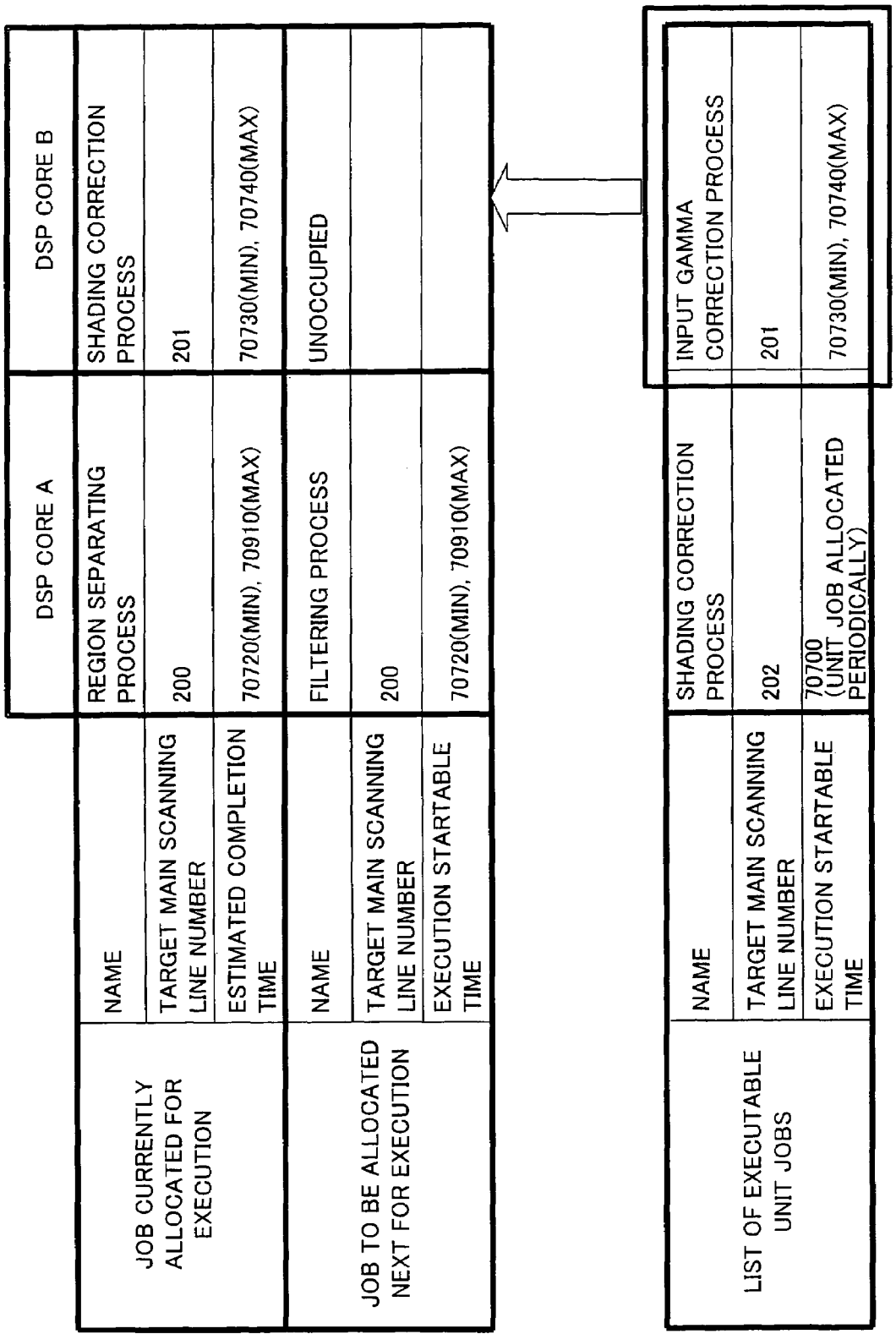
FIG. 7 is an explanatory diagram illustrating another example of the unit job scheduling operation performed by the general-purpose CPU shown in FIG. 3.

FIGS. 6 and 7 illustrate specific examples of the job allocation process (the unit job scheduling).

FIG. 6 illustrates a case in which a job slot of the DSP core A 20 is set free, and the list of executable unit jobs includes a filtering process for a main scanning line number 101 and an input gamma correction process for a main scanning line number 102. In this case, the filtering process is allocated to the job slot (which is set free) of the DSP core A 20, because the filtering process is executable only for the DSP core A 20.

FIG. 7 illustrates a case in which a job slot of the DSP core B 21 is set free, and the list of executable unit jobs includes a shading correction process for a main scanning line number 202 and an input gamma correction process for a main scanning line number 201. In this case, although both the unit jobs are general-purpose jobs, the input gamma correction process is allocated to the job slot (which is set free) of the DSP core B 21, because the main scanning line number of the input gamma correction process is smaller than that of the shading correction process.

As described above, in the image processing section 13 using the asymmetrical multiprocessor system of the present embodiment, a plurality of unit jobs (here, various image processing), workloads for which are foreseeable, are executed as follows. Before executing the unit jobs, unit job scheduling is performed. The unit jobs executable for the DSP core A 20 and the DSP core B 21 in the same execution time are preferentially allocated to the DSP core B 21, which can process relatively limited kinds of the unit jobs.

As described above, in the image processing section 13 using the asymmetrical multiprocessor system of the present embodiment, unit job scheduling is performed in executing a plurality of unit jobs (here, various image processing), workloads for which are foreseeable. In the unit job scheduling, the unit jobs are allocated job by job to the DSP cores in accordance with a difference between properties in respect of which the processors are asymmetrical, e.g. a difference in processing capabilities, so that each unit job is processed efficiently (e.g. so that the image processing as a whole is performed at a high speed). As a result, it is possible to process the unit jobs efficiently with less hardware resources.

In the present embodiment, the number of the DSP cores for performing the unit jobs is only two, for the purpose of explanation. However, the number of the DSP cores may be three or more. The same is true with the other embodiments described below.

Second Embodiment

With reference to the drawings, another embodiment of the present invention is described below. In an image forming apparatus including an asymmetrical multiprocessor system of the present embodiment, an image processing section 13 includes, instead of the image processing chip 29, an image processing chip 41 shown in FIG. 8. The image processing chip 41 includes, in addition to the members of the image processing chip 29, a clock generating circuit A 42 and a clock generating circuit B 43.

The clock generating circuit A 42 supplies a clock of a specified frequency to a DSP core A 20, in accordance with an operating frequency specifying signal 44 supplied from a general-purpose CPU core (mode switching means) 24. The clock generating circuit B 43 supplies a clock of a specified frequency to a DSP core B 21, in accordance with an operating frequency specifying signal 45 supplied from the general-purpose CPU core 24. Note that, in the present embodiment, the clock generating circuit A 42 and the clock generating circuit B 43 supply the clocks of identical frequencies to the DSP cores, respectively.

Compared to the DSP core B 21, the DSP core A 20 has a larger circuit size, because the DSP core A 20 is arranged so that an SIMD processing instruction can be executed therein. A size of a local memory (a 40 KB local RAM 22) of the DSP core A 20 is 40 KB, which is larger than a size (16 KB) of a local memory (a 16 KM local RAM 23) of the DSP core B 21. Therefore, even if the DSP core A 20 and the DSP core B 21 operate at the same clock frequency, power consumption of the DSP core A 20 is higher than that of the DSP core B 21. When the same kind of process is performed, the power consumption of the DSP core A 20 is always larger than that of the DSP core B 21. The difference between the power consumption of the DSP core A 20 and that of the DSP core B 21 varies, depending on contents of the process performed.

Thus, the DSP core A 20 is power-consuming, although the DSP core A 20 can execute all unit-job-execution programs for executing the unit jobs that constitute the image processing operation to be performed by the image processing section 13. On the other hand, the DSP core B 21 is relatively less power-consuming, although the DSP core B 21 cannot execute some of the unit jobs of the unit-job-execution programs, e.g. the color correction process. Moreover, because the DSP core B 21 does not have an arrangement for executing the SIMD processing instructions, the DSP core B 21 executes the filtering process by using a program code that is different from the program code for the DSP core A 20. As a result, the processing speed of the DSP core B 21 is lower, because the DSP core B 21 does not use SIMD processing instructions.

Figure 4:
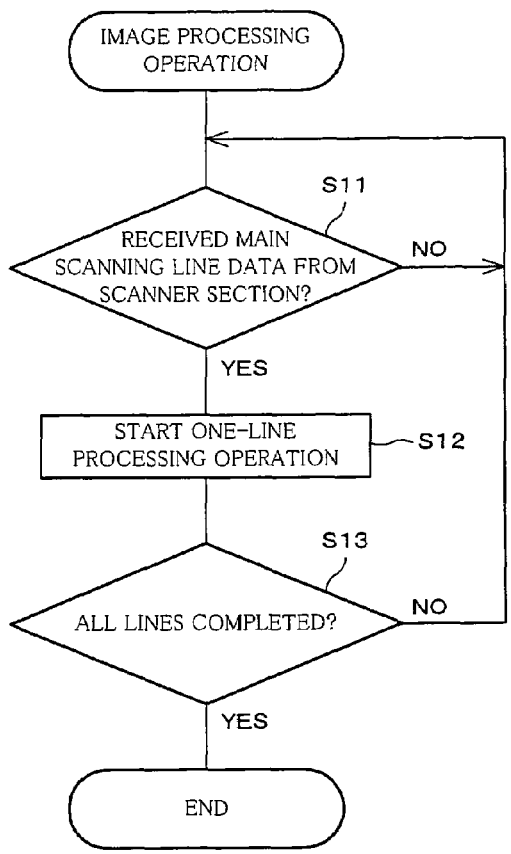
FIG. 4(a) is a schematic flowchart illustrating image processing operation performed by the image processing section shown in FIG. 3.
FIG. 4(b) is a flowchart illustrating a detail of one-line processing operation in FIG. 4(a).
Figure 4:
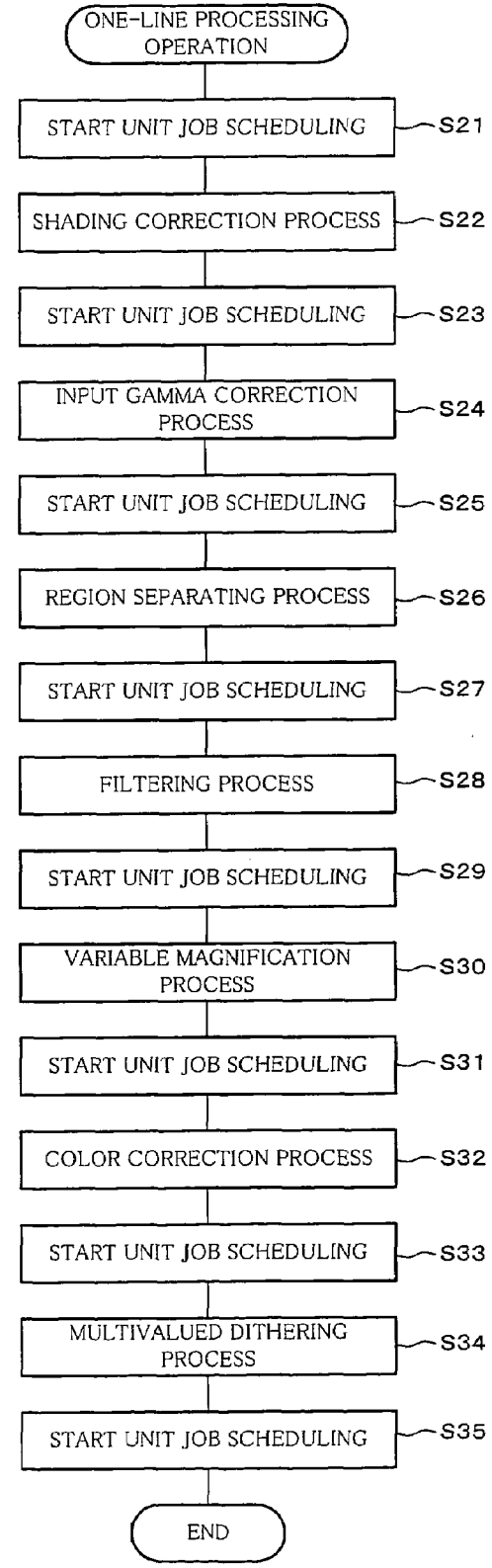

In the present embodiment, as in the foregoing embodiment, the image processing section 13 executes the series of image processing operation shown in the flowcharts of FIGS. 4(*a*) and 4(*b*), in accordance with a directive from the controller 11.

In the filtering process, there are a filtering process code A and a filtering process code B. The filtering process code A is written in a program code using SIMD instructions, and the filtering process code B is written in a program code not using SIMD instructions. The filtering process code A can be executed only by the DSP core A 20. On the other hand, the filtering process code B can be executed both by the DSP core A 20 and the DSP core B 21.

The general-purpose CPU 24 has unit job information shown in FIGS. 9(*a*) and 9(*b*). The unit job information is necessary in performing the scheduling. The unit job information includes (i) minimum, average, and maximum execution time for the unit job, (ii) information about whether or not the unit job is executable for the DSP core B 21, (iii) the dependency relations between the unit jobs, i.e. information about which unit job (process) should be executed next to the unit job, (iv) information shown in FIG. 9(*b*) about an interval of receiving main scanning line data, and (v) the like information.

Figure 10:
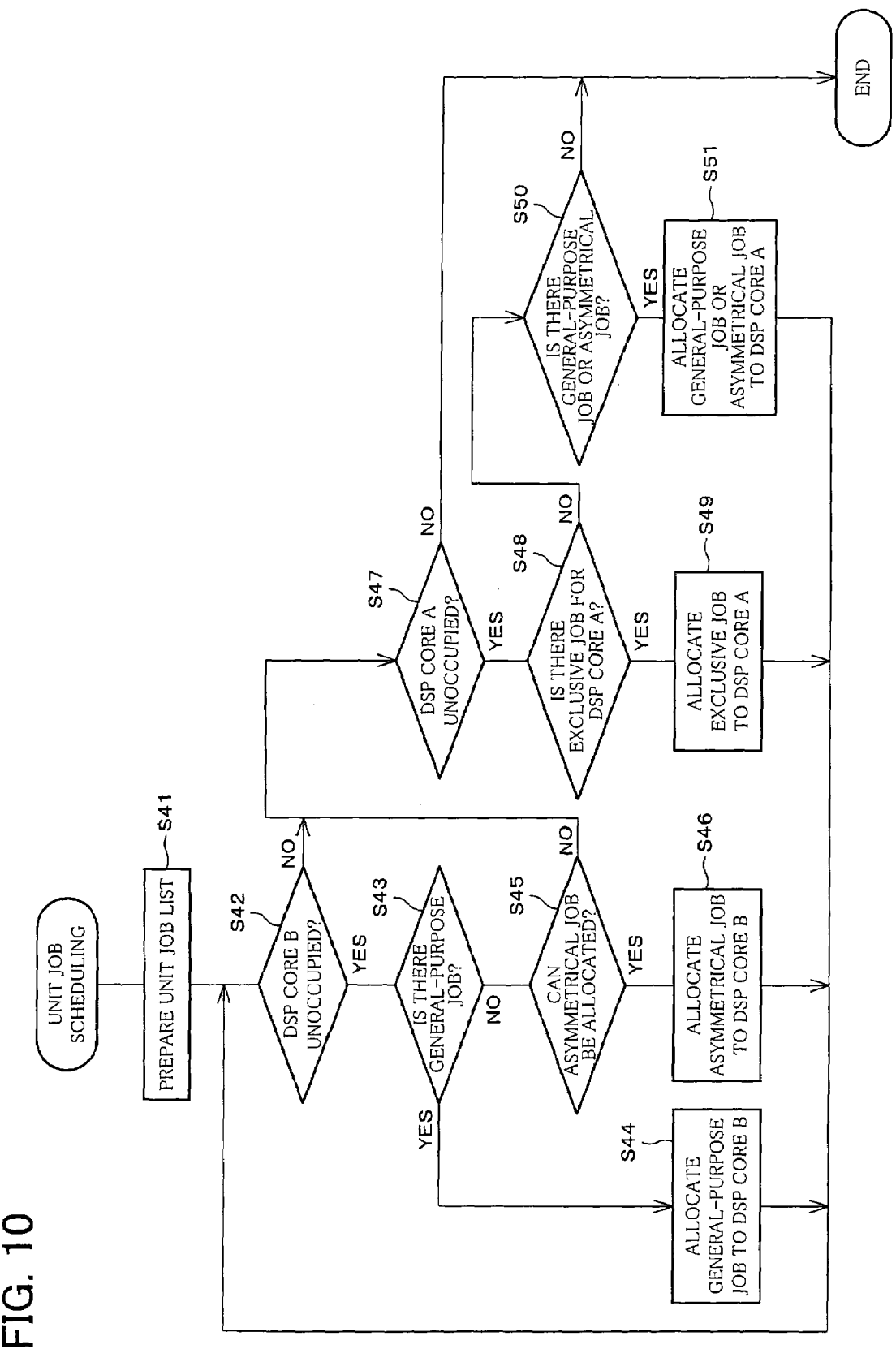
FIG. 10 is a flowchart illustrating the unit job scheduling operation of the image processing section shown in FIG. 8.

Next, unit job scheduling by the image processing section 13 of the present embodiment is described, with reference to the flowchart of FIG. 10.

In performing the scheduling, the general-purpose CPU 24 prepares, with respect to each DSP core, a list of unit jobs executable for the DSP core (target DSP core), and a list of unit jobs scheduled to be executed by the target DSP core (S41). As in the foregoing embodiment, in the list of unit jobs executable for the target DSP core, the unit jobs certainly executable for the target DSP core in an implementation phase are listed up. The unit jobs listed up for this purpose include:

(1) The unit job that is waiting for execution (i.e. that is active) in a scheduling phase;

(2) The unit job to be executed next to the unit job that is being executed by the target DSP core;

(3) The unit job to be executed next to the unit job (unit job A) that is being executed by the other DSP core, if the unit job A will be completed before the unit job (unit job B) that is being executed by the target DSP core is completed (here, it is estimated that the unit job A will be completed in a maximum execution time, and the unit job B will be completed in a minimum execution time); and (4) The unit job allocated periodically.

The unit jobs scheduled to be executed include:

(5) The unit job that is to be executed next to the unit job that is scheduled to be executed by the other DSP core; and (6) The unit job to be allocated next as a periodical allocation.

Note that, as in the foregoing example, the unit job of (3) may be the following unit job, considering the scheduling time necessary for the general-purpose CPU 24. Specifically, the unit job of (3) may be the unit job to be executed next to the unit job (unit job A) that is being executed by the other DSP core, if time required for completion of the unit job A (here, it is estimated that the unit job A will be completed in a maximum execution time) is shorter than a sum of (i) a minimum execution time for the unit job (unit job B) that is being executed by the target DSP core and (ii) the scheduling time required for the general-purpose CPU 24. In this case, the target DSP core has a function of starting, upon processing completion notifications from the other DSP core, the unit jobs allocated to the target DSP core.

After the unit job lists are prepared in S41, the general-purpose CPU 24 judges whether or not, in the DSP core B 21, there is any job slot to which no job is allocated, i.e. whether or not there is any unoccupied job slot (S42).

If there is any unoccupied job slot, the general-purpose CPU 24 judges whether or not the list of executable unit jobs includes any unit job that is executable in the same processing time by the DSP core A 20 and the DSP core B 21, i.e. if there is any general-purpose job (S43). If there is any general-purpose job, the general-purpose job is allocated to the DSP core B 21 (S44). Then, the scheduling process turns back to S42.

If, in S43, there is no general-purpose job, but there is an asymmetrical job, it is judged whether or not to allocate the asymmetrical job to the DSP core B 21 (S45). Here, an asymmetrical job is a unit job that is executable for both the DSP core A 20 and the DSP core B21, and that requires different time for execution by the DSP core A 20 and by the DSP core B21, because the programs executed are different.

Whether or not to allocate the asymmetrical job to the DSP core B 21 is judged as follows. In the present embodiment, the filtering process is an asymmetrical job. A difference between (i) average execution time 120 for executing the filtering process by the DSP core A 20 using the filtering process code A, and (ii) average execution time 200 for executing the filtering process by the DSP core B 21 using the filtering process code B is time 80. Therefore, the filtering process is allocated to the DSP core B 21 only if it is expected that there will be no executable general-purpose job within the time 80 (S46). Then, the scheduling process turns back to S42.

If, in S42, the DSP core B21 does not have any job slot to which no job is allocated, i.e. that the DSP core B21 has no unoccupied job slot, or if no asymmetrical job can be allocated to the DSP core A 20 according to the foregoing criteria in S45, it is judged whether or not the DSP core A 20 has any unoccupied job slot (S47).

If the DSP core A 20 has any unoccupied job slot, it is judged whether or not the list of executable unit jobs includes any unit job that is executable only for the DSP core A 20, i.e. whether or not there is any exclusive job (S48). If there is any exclusive job, the exclusive job is allocated to the DSP core A 20 (S49). Then, the scheduling process turns back to S42.

On the other hand, if there is no exclusive job in S48, it is judged whether or not there is any general-purpose job or asymmetrical job (S50). If there is any general-purpose job or asymmetrical job in S50, the unit job is allocated to the DSP core A20 (S51). Then, the scheduling process turns back to S42.

If the DSP core A 20 has no unoccupied job slot in S47, or if there is no general-purpose job or asymmetrical job in S50, the scheduling process is terminated.

If there are more than one jobs of the same kind in S43, S45, S48, and/or S50, in which it is judged whether or not there is any general-purpose job, asymmetrical job, and exclusive job, the unit job whose main scanning line number is smaller is selected preferentially.

For example, a job slot of the DSP core A 20 is set free under a condition shown in FIG. 11, and the list of executable unit jobs includes a filtering process of a main scanning line number 100. Because the filtering process is an asymmetrical job, it is judged in S45 whether or not to allocate the filtering process to the DSP core B 21. At this time, there is no unit job to be executed next to a multivalued dithering process that is a unit job scheduled to be executed in the DSP core A 20. Therefore, the only unit job scheduled to be executed is a shading correction process of a main scanning line number 101, the shading correction process being a unit job allocated periodically. In this example, it is estimated that an average completion time of a region separating process of the main scanning line number 100, the region separating process being a unit job that is currently executed by the DSP core B 21, is 50250. Therefore, time 250 is left until 50500, at which the shading correction process of the main scanning line number 101 becomes executable. In this situation, it is more efficient to execute the filtering process by using the DSP core B 21, although the execution time necessary for the DSP core B 21 to execute the filtering process will be longer, by time 80, than the execution time necessary for the DSP core A 20 to execute the filtering process. Therefore, the filtering process is registered as a unit job that is scheduled to be executed by the DSP core B 21.

As described above, in the image processing section 13 using the asymmetrical multiprocessor system of the present embodiment, unit job scheduling is performed in executing a plurality of unit jobs (here, various image processing), workloads for which are foreseeable. In the unit job scheduling, the unit jobs that are executable for the DSP core A 20 and the DSP core B 21 in the same execution time are preferentially allocated to the DSP core B 21, which can process relatively limited kinds of unit jobs.

Moreover, an asymmetrical job, i.e. a unit job that is executable for the DSP core A 20 and the DSP core B 21, and that requires different time for execution by the DSP core A 20 and by the DSP core B 21 because the programs executed are different, is allocated to the DSP core A 20 or the DSP core B 21 that is expected, in view of completion time of the unit job currently executed, to complete the asymmetrical job earlier.

As described above, in the image processing section 13 using the asymmetrical multiprocessor system of the present embodiment, a plurality of unit jobs (here, various image processing), workloads for which are foreseeable, are executed as follows. The unit jobs are allocated to the DSP cores in accordance with a difference between properties in respect of which the processors are asymmetrical, e.g. a difference in processing capabilities, so that each unit job is processed efficiently (e.g. so that the image processing as a whole is performed at a high speed). As a result, it is possible to process the unit jobs efficiently with less hardware resources.

Third Embodiment

With reference to the drawings, yet another embodiment of the present invention is described below.

In the present embodiment, an arrangement of an image forming apparatus (digital copying apparatus) and an arrangement of an image processing section 13 are the same as those in the Second Embodiment. Moreover, image processing operation is also the same as the image processing operation shown in the flowcharts of FIGS. 4(a) and 4(b). Therefore, explanations thereof are omitted in the following description.

Figure 8:
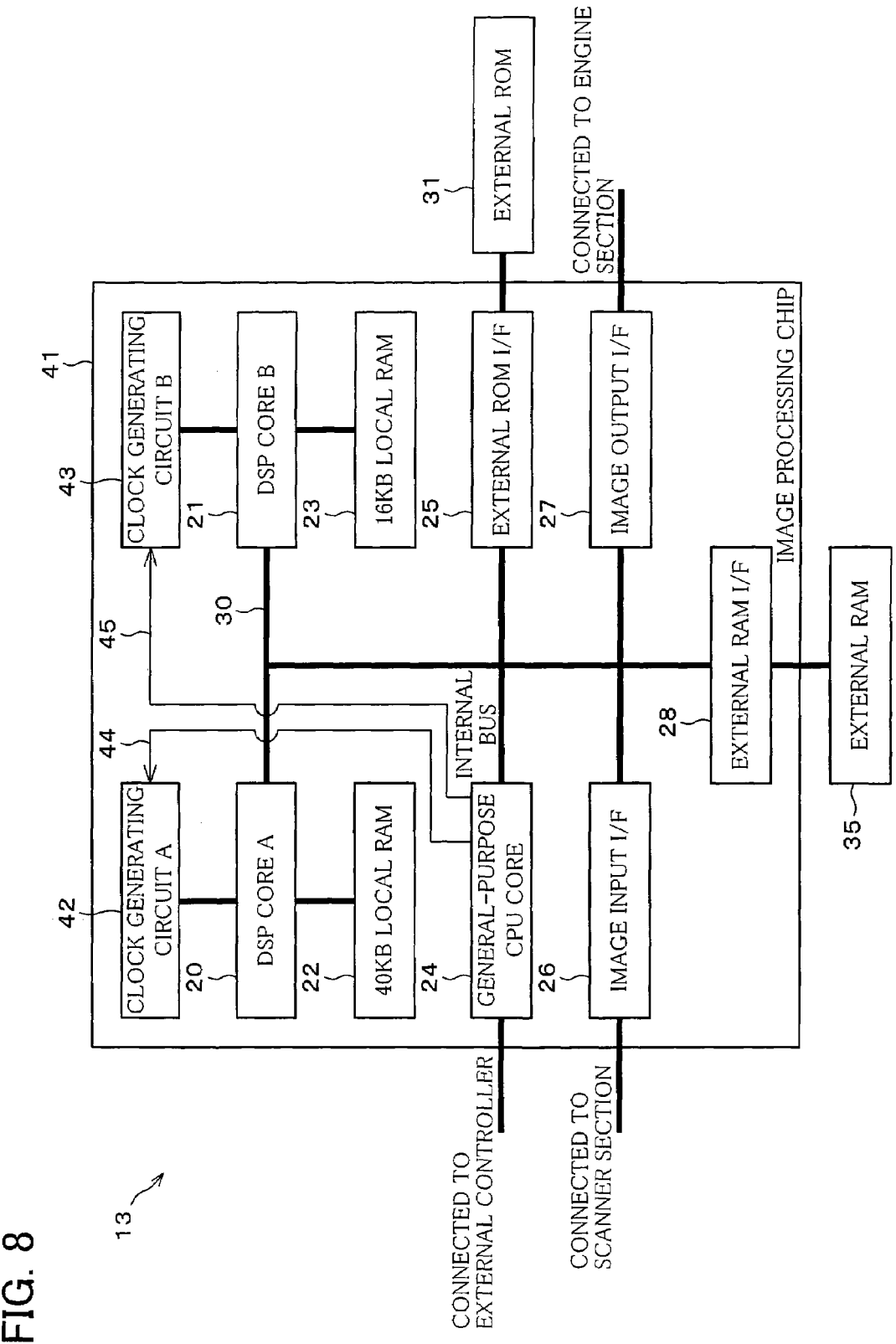
FIG. 8 is a block diagram illustrating an arrangement of an image processing section of a digital copying apparatus using an asymmetrical multiprocessor system of another embodiment of the present invention.

However, in the present embodiment, a clock generating circuit A 42 and a clock generating circuit B 43 shown in FIG. 8 respectively supply, to DSP cores, clocks of such frequencies that are in accordance with a scheduling result.

Next, unit job scheduling in the present embodiment is described.

In the image processing operation by the image processing section 13, a general-purpose CPU 24 performs sequence control, so as to determine in what order the unit jobs are to be executed. Then, the unit jobs are allocated to the DSP core A 20 or to the DSP core B 21.

The unit job scheduling is executed by the general-purpose CPU 24 at the beginning of the image processing operation, and upon each unit job completion notification from the DSP cores. Because the unit job scheduling itself requires time, the general-purpose CPU 24 determines, every time execution of a unit job is completed by the DSP cores, which unit jobs should be executed next. In this way, the DSP cores can operate effectively. Therefore, in the present embodiment, the DSP cores are treated and scheduled as job slots for two kinds of jobs, i.e. the jobs to be executed now and the jobs to be executed next.

In the present embodiment, the general-purpose CPU 24 of the image processing section 13 has the following unit job information: (i) minimum, average, and maximum execution time with respect to each unit job, (ii) an average power consumption index with respect to each unit job, (iii) information about whether or not the unit job is executable for the DSP core B 21, (iv) information about which unit job should be executed next, (v) information about an interval of receiving main scanning line data, and (vi) the like information. The unit job information of (i) to (iv) is shown in FIG. 12(a), and the unit job information of (v) is shown in FIG. 12(b).

Figure 13:
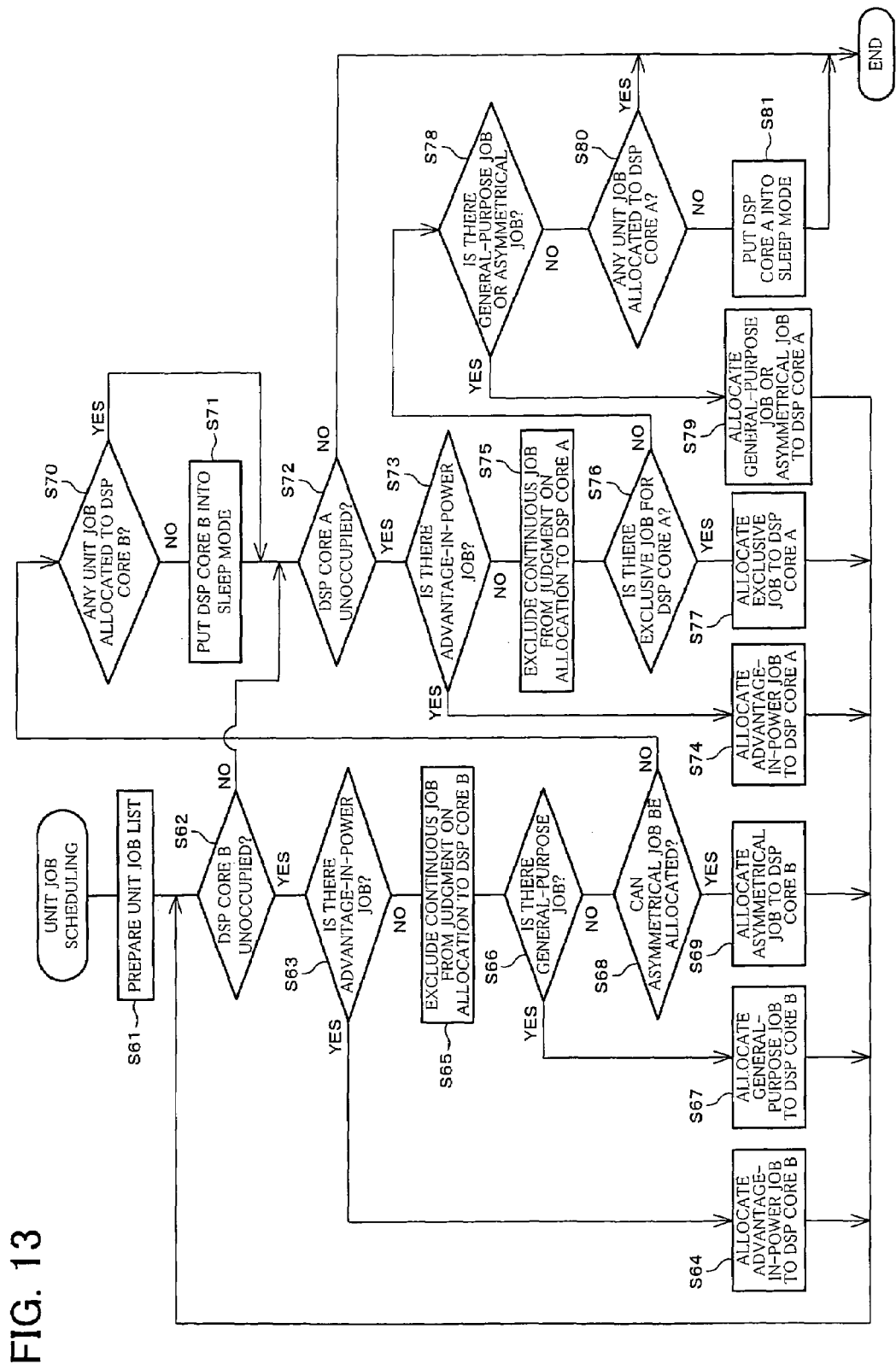
FIG. 13 is a flowchart illustrating unit job scheduling operation of an image processing section of a further embodiment of the present invention.

In the image processing section 13 of the present embodiment, the general-purpose CPU 24 performs unit job scheduling according to the flow shown in FIG. 13, as in the Second Embodiment.

In performing the scheduling, the general-purpose CPU 24 prepares, with respect to each DSP core, a list of executable jobs executable for the DSP core, and a list of unit jobs scheduled to be executed by the DSP core (S61).

The list of executable jobs executable for the DSP core includes the unit jobs of (1) to (4) described above. The list of unit jobs scheduled to be executed by the DSP core includes the unit jobs of (5) to (6) described above. Another example of the unit job of (3) is also the same as that of the foregoing example.

After the lists of unit jobs are prepared in S61, the general-purpose CPU 24 judges whether or not the DSP core B 21 has any job slot to which no unit job is allocated, i.e. whether or not the DSP core B 21 has any unoccupied job slot (S62).

If there is any unoccupied job slot, it is judged whether or not the list of executable unit jobs include any unit job (advantage-in-power job) whose average power consumption index of a case in which the unit job is executed by the DSP core B 21 is lower than that of a case in which the unit job is executed by the DSP core A 20 (S63). If there is any advantage-in-power job in S63, the advantage-in-power job is allocated to the DSP core B 21 (S64). Then, the scheduling process turns back to S62. If the DSP core B 21 has no unoccupied job slot in S62, the scheduling process proceeds to S72.

If there is no advantage-in-power job in S63, it is judged whether or not the list of executable unit jobs include (i) the unit job that should be executed next to the unit job that is currently executed by the DSP core A 20, and (ii) the unit job that should be executed next to the unit job that is scheduled to be executed. Then, if any, these unit jobs are excluded from a judgment on allocation to the DSP core B 21 (S65).

Next, it is judged whether or not the list of executable unit jobs includes any unit job that is executable in the same processing time by the DSP core A 20 and by the DSP core B 21, i.e. whether or not there is any general-purpose job (S66). If there is any general-purpose job, the unit job is allocated to the DSP core B 21 (S67). Then, the scheduling process turns back to S62.

If, in S66, there is no general-purpose job, but there is an asymmetrical job, i.e. a job that is executable for the DSP core A 20 and the DSP core B 21, and that requires different time for execution by DSP core A 20 and the DSP core B 21 because programs executed are different, it is judged whether or not to allocate the asymmetrical job to the DSP core B 21 (S68).

As in the foregoing embodiment, this judgment is made as follows. In the present embodiment, the filtering process is an asymmetrical job. A difference between (i) average execution time 120 for executing the filtering process by the DSP core A 20 using the filtering process code A, and (ii) average execution time 200 for executing the filtering process by the DSP core B 21 using the filtering process code B is time 80. Therefore, the filtering process is allocated to the DSP core B 21 only if it is expected that there will be no executable general-purpose job within the time 80 (S69). Then, the scheduling process turns back to S62.

If no asymmetrical job is allocated in S68 to the DSP core B 21, it is judged whether or not any unit job is currently allocated to the DSP core B21 (S70). If no unit job is currently allocated, the DSP core B 21 is put into its sleep mode (S71).

The sleep mode of the DSP core B 21 is a power-saving mode, in which power consumption is lower than in an operation mode, in which the DSP core B 21 is enabled to execute unit jobs. The sleep mode is realized by giving an instruction to the clock generating circuit B 43 by using the general-purpose CPU 24, so as to stop, until the next unit job is allocated to the DSP core B 21, supply of the clock signal from the clock generating circuit B 43 to the DSP core B 21. In this way, operation of the DSP core B 21 is stopped, and unnecessary power consumption is reduced.

Note that the sleep mode may be realized, for example, by lowering a clock frequency or by changing a line voltage supplied to the DSP core B 21.

Subsequently, it is judged whether or not the DSP core A 20 has any unoccupied job slot (S72). If the DSP core A 20 has any unoccupied job slot, it is judged whether or not the list of executable unit jobs includes any advantage-in-power job for the DSP core A 20 (S73).

If there is any advantage-in-power job in S73, the advantage-in-power job is allocated to the DSP core A 20 (S74). Then, the scheduling process turns back to S62.

On the other hand, if there is no advantage-in-power job, it is judged whether or not the list of executable unit jobs includes (i) the unit job that should be executed next to the unit job that is currently executed by the DSP core B 21, and (ii) the unit job that should be executed next to the unit job that is scheduled to be executed. Then, if any, these unit jobs are excluded from a judgment on allocation to the DSP core A 20 (S75).

Next, it is judged whether or not the list of executable unit jobs includes any unit job that is executable only for the DSP core A 20, i.e. whether or not there is any exclusive unit job (S76). If there is any exclusive unit job, the exclusive job is allocated to the DSP core A 20 (S77). Then, the scheduling process turns back to S62.

If there is no exclusive job in S76, it is judged whether or not there is any general-purpose job or asymmetrical job (S78). If there is any general-purpose job or asymmetrical job, the unit job is allocated to the DSP core A 20 (S79). Then, the scheduling process turns back to S62.

If there is no general-purpose job or asymmetrical job in S78, it is judged whether or not any unit job is currently allocated to the DSP core A 20 (S80). If no unit job is currently allocated, the DSP core A 20 is put into its sleep mode (S81).

The sleep mode of the DSP core A 20 is realized by giving an instruction to the clock generating circuit A 44 by using the general-purpose CPU 24, so as to stop, until the next unit job is allocated to the DSP core A 20, supply of the clock signal to the DSP core A 20. In this way, operation of the DSP core A 20 is stopped, and unnecessary power consumption is reduced.

Note that the sleep mode may be realized, for example, by lowering a clock frequency or by changing a line voltage supplied to the DSP core A 20.

If there are more than one jobs of the same kind in S63, S66, S68, S73, S76, and/or S78, in which it is judged whether or not there is any general-purpose job, asymmetrical job, and exclusive job, the unit job whose main scanning line number is smaller is selected preferentially.

Figure 14:
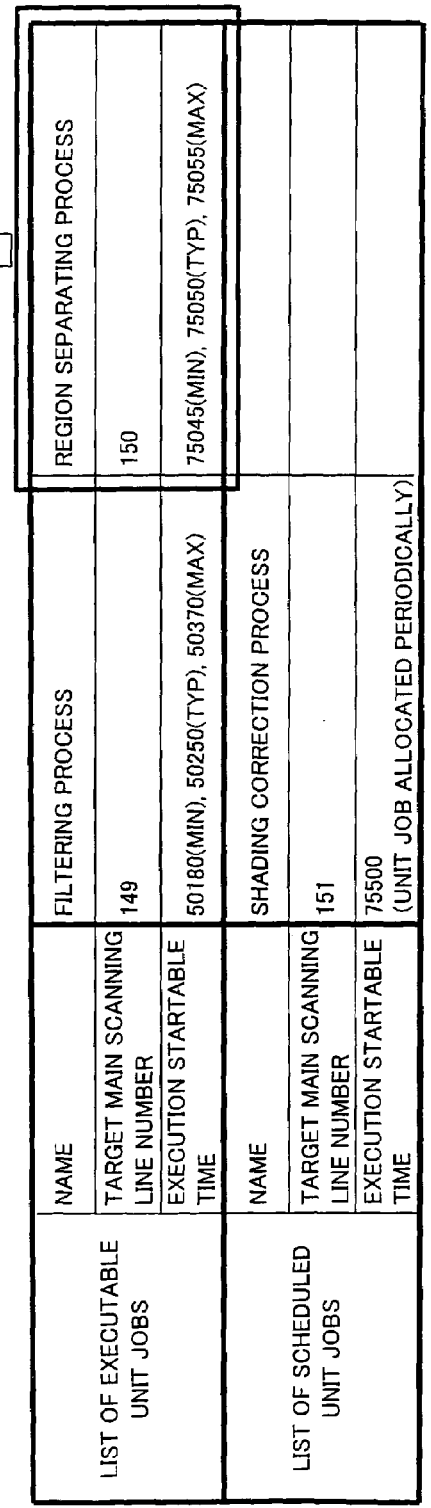
FIG. 14 is an explanatory diagram illustrating one example of the unit job scheduling operation performed by a general-purpose CPU of the image processing section that performs the operation of FIG. 13.

For example, if a job slot of the DSP core B 21 is set free under a condition shown in FIG. 14, the list of executable unit jobs includes a filtering process of a main scanning line number 149 and a region separating process of a main scanning line number 150. The only unit job scheduled to be executed is a shading correction process of a main scanning line number 151, the shading correction process being a unit job allocated periodically. Here, the filtering process is not an advantage-in-power job for the DSP core B 21, but the region separating process is an advantage-in-power job for the DSP core B 21. Therefore, in terms of power efficiency, it is better to execute the region separating process by using the DSP core B 21. Thus, the region separating process of the main scanning line number 150 is registered as a unit job scheduled to be executed by the DSP core B 21.

As described above, in the image processing section 13 using the asymmetrical multiprocessor system of the present embodiment, unit job scheduling is performed in executing a plurality of unit jobs (here, various image processing), workloads for which are foreseeable. In the unit job scheduling, the unit jobs that are executable for the DSP core A 20 and the DSP core B 21 in the same execution time are preferentially allocated to the DSP core B 21, which can process relatively limited kinds of the unit jobs.

Moreover, an asymmetrical job, i.e. a unit job that is executable for both the DSP core A 20 and the DSP core B 21, and that requires different time for execution by the DSP core A 20 and by the DSP core because the programs executed are different, is allocated to the DSP core A 20 or the DSP core B 21 that is expected, in view of completion time of the unit job currently executed, to complete the asymmetrical job earlier.

The advantage-in-power job, for execution of which power consumption is different between the DSP core A 20 and the DSP core B 21, is preferentially allocated to the DSP core B 21, in which power consumption is lower.

Furthermore, the DSP core A 20 and the DSP core B 21 are, when there is no unit job to be allocated thereto, put into their respective sleep modes. In this way, power consumption is reduced.

As described above, in the image processing section 13 using the asymmetrical multiprocessor system of the present embodiment, unit job scheduling is performed in executing a plurality of unit jobs (here, various image processing), workloads for which are foreseeable. In the unit job scheduling, the unit jobs are allocated to the DSP cores in accordance with a difference between properties in respect of which the processors are asymmetrical, e.g. a difference in processing capabilities, so that each unit job is processed efficiently (e.g. so that the image processing as a whole is performed at a high speed). As a result, it is possible to process the unit jobs efficiently with less hardware resources.

Moreover, because the unit jobs are allocated in such a manner as to reduce power consumption, power-saving is attained.

Note that the image processing apparatus using the asymmetrical multiprocessor system of the foregoing embodiments is not limited to that of a particular shape, as long as the image processing apparatus has the function of performing the image processing by using the asymmetrical multiprocessor system. For example, the image processing apparatus may be an image processing substrate on which members that can attain the foregoing function are mounted.

The image forming apparatus is not limited to a digital copying apparatus. The image forming apparatus may be a printer of some type, an apparatus having no printing function (e.g. apparatus that displays, on a display screen, an image that has already been processed), or the like.

In the foregoing embodiments, the dependency relations between the unit jobs are not limited to the order of executing the unit jobs, but may include a relationship in which whether or not a unit job can be executed is determined in accordance with information about an execution state (e.g. execution not started, under execution, or execution completed, and if under execution, execution start time and execution completion time) of another unit job.

In the foregoing embodiments, the unit job scheduling for each DSP core is performed by the general-purpose CPU 24. However, the scheduling may be performed by a DSP core, as long as a processing capability of the DSP core is not lowered significantly.

In the foregoing embodiments, described is an example in which a relationship between the DSP core A 20 and the DSP core B 21 is such that the instruction set of the DSP core A 20 is a superset of the instruction set (instruction subset) of the DSP core B 21, i.e. the instruction sets have an inclusive relationship. However, the scope of the present invention covers a case in which a part of the instruction set of the DSP core A 20 constitutes a part of the instruction set of the DSP core B 21, and, apart from this, each DSP core has an instruction set that is executable only for the DSP core, i.e. a case in which the instruction sets have an overlapping relationship.

The asymmetrical multiprocessor system provided to the image forming apparatus of the foregoing embodiments is "asymmetrical" in that a characteristic of one of the plurality of processors cannot be realized in at least another one of the plurality of processors. Specifically, the term "asymmetrical" has the following meaning, for example:

(1) The instruction sets are not identical (completely different, or having an inclusive relationship or an overlapping relationship);

(2) The local memories are not identical (sizes, and/or arrangements are different);

(3) The processing capabilities are not identical (clock frequencies, execution cycles, and/or bus performance are different);

(4) The power consumption is not identical; and (5) Accessible peripheral functions (floating point units, accelerators having specific functions, and the like) are not identical.

As described above, the asymmetrical multiprocessor system of the present invention may further include mode switching means for switching each processor between an operation mode and a power-saving mode, in accordance with a result of a process performed by the unit job scheduling means, the operation mode being a mode in which the processor is enabled to execute unit jobs, and the power-saving mode being a mode in which power consumption is lower than in the operation mode.

With this arrangement, it is possible to switch the power consumption modes of the processor elements in accordance with a result of the scheduling performed by the unit job scheduling means, thereby reducing power consumption efficiently.

The asymmetrical multiprocessor system may be arranged so that a memory for the first processor and a memory for the second processor have memory capacities that are different from each other.

With this arrangement, by allocating the unit jobs to the processors in accordance with the memory capacities required for processing the unit jobs, it is possible to realize, with relatively less hardware resources, a processing capability required for the asymmetrical multiprocessors.

The asymmetrical multiprocessor system may be arranged so that the first processor is capable of executing an instruction set for executing unit jobs; and the second processor is capable of executing at least an instruction subset that is a part of the instruction set.

This arrangement increases the number of processor elements to which many unit jobs except some unit jobs may be allocated. Here, the some unit jobs are such unit jobs that use special instruction sets for high-speed operation, for example. Thus, this arrangement realizes, with relatively less hardware resources, a processing capability required for the asymmetrical multiprocessors.

The asymmetrical multiprocessor system may be arranged so that the unit job processing information includes (i) information, with respect to each unit job, about an estimated value of time required for processing the unit job, (ii) information about dependency relations between the unit jobs, and (iii) information, with respect to each unit job, about which processor is capable of executing the unit job.

With this arrangement, it is possible to allocate the unit jobs efficiently, because the unit job processing information includes the information (i) to (iii). As a result, it is possible to perform job scheduling in which waiting time, which is wasteful, of the processor elements is shortened.

The asymmetrical multiprocessor system may be arranged so that the unit job scheduling means determines, at least at an end of each unit job, in what order the unit jobs are to be executed.

With this arrangement, it is possible to allocate, right after a job slot is set free, a unit job that should be executed next. Thus, this arrangement realizes efficient job scheduling.

The asymmetrical multiprocessor system may be arranged so that the unit job scheduling means performs (i) a process of extracting the unit job executable for one or more of the plurality of processors, (ii) a process of extracting the processor that is not yet scheduled which unit job to execute, and (iii) a process of allocating, to the processor extracted, the unit job executable for the processor extracted.

With this arrangement, the processors are not required to judge which unit jobs are executable and which unit jobs are not. Therefore, the processors can be controlled in a simpler manner.

The asymmetrical multiprocessor system may be arranged so that the unit job scheduling means allocates a unit job to the second processor, which is capable of executing at least the unit job, preferentially over the first processor, which is capable of executing more kinds of unit jobs than the second processor is.

In this arrangement, a unit job executable for a processor that is capable of executing relatively fewer kinds of unit jobs is allocated to the processor preferentially over a processor that is capable of executing relatively a larger variety of unit jobs. This prevents a problem that an operation efficiency of the asymmetrical multiprocessor system is decreased, i.e. a problem that a processor that is capable of executing relatively fewer kinds of unit jobs is left unoccupied, thereby relatively decreasing probabilities of allocation of the other unit jobs that are not executable for the processor that is capable of executing relatively fewer kinds of unit jobs.

An image processing apparatus of the present invention includes any one of the asymmetrical multiprocessor systems. With this arrangement, it is possible to shorten, as much as possible, waiting time of each processor element of the image processing apparatus having the asymmetrical arrangement. This is attained by performing the unit job scheduling according to the following characteristics of the image processing: (i) Margins of fluctuation of execution time for the unit jobs are foreseeable, and (ii) The unit job that should be executed next is determined in advance.

An image forming apparatus of the present invention includes the image processing apparatus. With this arrangement, it is possible to shorten, as much as possible, waiting time of each processor element of the image processing apparatus having the asymmetrical arrangement. This is attained by performing the unit job scheduling according to the following characteristics of the image processing: (i) Margins of fluctuation of execution time for the unit jobs are foreseeable, and (ii) The unit job that should be executed next is determined in advance.

An asymmetrical multiprocessor system of the present invention includes a plurality of processors for executing a plurality of unit jobs, workloads for which are foreseeable, the unit jobs being allocated job by job to the plurality of processors, at least a first processor and a second processor being asymmetrical to each other, the asymmetrical multiprocessor system including: unit job processing information generating means for generating unit job processing information, which is used as reference information when the unit jobs are allocated to the plurality of processors; unit job scheduling means for determining, in accordance with the unit job processing information, in what order the unit jobs are to be executed, and to which processor the unit jobs are to be allocated; and unit job execution instructing means for instructing, in accordance with a result of determination of the unit job scheduling means, the plurality of processors to execute the unit jobs.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An asymmetrical multiprocessor system comprising a plurality of processors for executing a plurality of unit jobs, workloads for which are foreseeable, the unit jobs being allocated job by job to the plurality of processors, at least a first processor and a second processor being asymmetrical to each other, the asymmetrical multiprocessor system comprising:
   unit job processing information generating means into which image data read by an image reading apparatus is inputted and which is for generating unit job processing information including a main scanning line number that indicates an order of main scanning line data read at a certain interval in a main scanning direction by the image reading apparatus, the unit job processing information being used as reference information when the unit jobs are allocated to the plurality of processors, the unit jobs being included in processes to be applied to the main scanning line data; and
   unit job scheduling means for determining, in accordance with the unit job processing information, in what order the unit jobs are to be executed, and to which processor the unit jobs are to be allocated wherein:
   the first processor executes an instruction set for executing the unit jobs;
   the second processor executes at least an instruction subset that is a part of the instruction set; and
   an exclusive job, among the unit jobs, is allocated to the first processor preferentially over a general-purpose job and an asymmetrical job,
   the exclusive job being a job executable only for the first processor,
   the general-purpose job being a job executable for the first processor and the second processor, and
   the asymmetrical job being a job that is executable for the first processor and the second processor, and that requires different time for execution by the first processor and the second processor because programs executed are different.

2. The asymmetrical multiprocessor system as set forth in claim 1, wherein:
   at least one of the unit jobs is executable for the first processor and the second processor in accordance with programs that are different from each other.

3. The asymmetrical multiprocessor system as set forth in one of claims 1 and 2, wherein:
   the unit job scheduling means allocates a unit job to the second processor, which is capable of executing at least the unit job, preferentially over the first processor, which is capable of executing more kinds of unit jobs than the second processor is.

4. The asymmetrical multiprocessor system as set forth in claim 1, wherein:
   the unit job processing information includes information about power consumption of each of the processors; and
   in accordance with the information about power consumption, the unit job scheduling means determines to which processor the unit jobs are to be allocated, determination being done in such a manner that the power consumption is reduced.

5. An asymmetrical multiprocessor system as set forth in claim 1, further comprising:
   mode switching means for switching each processor between an operation mode and a power-saving mode, in accordance with a result of a process performed by the unit job scheduling means, the operation mode being a mode in which the processor is enabled to execute unit jobs, and the power-saving mode being a mode in which power consumption is lower than in the operation mode.

6. The asymmetrical multiprocessor system as set forth in claim 1, wherein:

a memory for the first processor and a memory for the second processor have memory capacities that are different from each other.

7. The asymmetrical multiprocessor system as set forth in claim 1, wherein:

the first processor is capable of executing an instruction set for executing unit jobs; and the second processor is capable of executing at least an instruction subset that is a part of the instruction set.

8. The asymmetrical multiprocessor system as set forth in claim 7, wherein:

the unit job scheduling means allocates a general-purpose job, among the unit jobs, to the second processor preferentially over the first processor, the general-purpose job being a job executable for the first processor and the second processor.

9. The asymmetrical multiprocessor system as set forth in claim 1, wherein:

the unit job processing information includes (i) information, with respect to each unit job, about an estimated value of time required for processing the unit job, (ii) information about dependency relations between the unit jobs, and (iii) information, with respect to each unit job, about which processor is capable of executing the unit job.

10. The asymmetrical multiprocessor system as set forth in claim 1, wherein:

the unit job scheduling means determines, at least at an end of each unit job, in what order the unit jobs are to be executed.

11. The asymmetrical multiprocessor system as set forth in claim 1, wherein:

the unit job scheduling means performs (i) a process of extracting the unit job executable for one or more of the plurality of processors, (ii) a process of extracting the processor that is not yet scheduled which unit job to execute, and (iii) a process of allocating, to the processor extracted, the unit job executable for the processor extracted.

12. An image processing apparatus, comprising an asymmetrical multiprocessor system, including a plurality of processors for executing a plurality of unit jobs, workloads for which are foreseeable, the unit jobs being allocated job by job to the plurality of processors, at least a first processor and a second processor being asymmetrical to each other, the asymmetrical multiprocessor system including:

unit job processing information generating means into which image data read by an image reading apparatus is inputted and which is for generating unit job processing information including a main scanning line number that indicates an order of main scanning line data read at a certain interval in a main scanning direction by the image reading apparatus, the unit job processing information being used as reference information when the unit jobs are allocated to the plurality of processors, the unit jobs being included in processes to be applied to the main scanning line data; and unit job scheduling means for determining, in accordance with the unit job processing information, in what order the unit jobs are to be executed, and to which processor the unit jobs are to be allocated, wherein:

the first processor executes an instruction set for executing the unit jobs;

the second processor executes at least an instruction subset that is a part of the instruction set; and an exclusive job, among the unit jobs, is allocated to the first processor preferentially over a general-purpose job and an asymmetrical job, the exclusive job being a job executable only for the first processor, the general-purpose job being a job executable for the first processor and the second processor, and the asymmetrical job being a job that is executable for the first processor and the second processor, and that requires different time for execution by the first processor and the second processor because programs executed are different.

13. An image forming apparatus comprising an image processing apparatus, including an image reading apparatus, and an asymmetrical multiprocessor system, including a plurality of processors for executing a plurality of unit jobs, workloads for which are foreseeable, the unit jobs being allocated job by job to the plurality of processors, at least a first processor and a second processor being asymmetrical to each other, the asymmetrical multiprocessor system including:

unit job processing information generating means into which image data read by an image reading apparatus is inputted and which is for generating unit job processing information including a main scanning line number that indicates an order of main scanning line data read at a certain interval in a main scanning direction by the image reading apparatus, the unit job processing information being used as reference information when the unit jobs are allocated to the plurality of processors, the unit jobs being included in processes to be applied to the main scanning line data; and unit job scheduling means for determining, in accordance with the unit job processing information, in what order the unit jobs are to be executed, and to which processor the unit jobs are to be allocated, wherein:

the first processor executes an instruction set for executing the unit jobs;

the second processor executes at least an instruction subset that is a part of the instruction set; and an exclusive job, among the unit jobs, is allocated to the first processor preferentially over a general-purpose job and an asymmetrical job, the exclusive job being a job executable only for the first processor, the general-purpose job being a job executable for the first processor and the second processor, and the asymmetrical job being a job that is executable for the first processor and the second processor, and that requires different time for execution by the first processor and the second processor because programs executed are different.

14. A unit job processing method using asymmetrical multiprocessors for executing a plurality of unit jobs, workloads for which are foreseeable, the unit jobs being allocated job by job to the asymmetrical multiprocessors, the asymmetrical multiprocessors including at least a first processor and a second processor, which are asymmetrical to each other, the unit job processing method comprising the steps of:

generating unit job processing information including a main scanning line number that indicates an order of main scanning line data read at a certain interval in a main scanning direction by an image reading apparatus, the unit job processing information being used as reference information when the unit jobs are allocated to the plurality of processors, the unit jobs being included in processes to be applied to the main scanning line data; and determining, in accordance with the unit job processing information, in what order the unit jobs are to be executed, and to which processor the unit jobs are to be allocated, wherein:

the first processor executes an instruction set for executing the unit jobs;

the second processor executes at least an instruction subset that is a part of the instruction set; and an exclusive job, among the unit jobs, is allocated to the first processor preferentially over a general-purpose job and an asymmetrical job, the exclusive job being a job executable only for the first processor, the general-purpose job being a job executable for the first processor and the second processor, and the asymmetrical job being a job that is executable for the first processor and the second processor, and that requires different time for execution by the first processor and the second processor because programs executed are different.

15. The unit job processing method as set forth in claim 14, wherein:

at least one of the unit jobs is executable for the first processor and the second processor in accordance with programs that are different from each other.

* * * * *